(12) United States Patent
Nara

(10) Patent No.: US 12,488,437 B2
(45) Date of Patent: Dec. 2, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Saeko Nara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/624,921

(22) Filed: Apr. 2, 2024

(65) Prior Publication Data

US 2024/0338801 A1   Oct. 10, 2024

(30) Foreign Application Priority Data

Apr. 5, 2023   (JP) ................. 2023-061732

(51) Int. Cl.
  *G06T 5/70* (2024.01)
  *G06T 7/246* (2017.01)
  *G06V 10/62* (2022.01)
  *G06V 20/20* (2022.01)
  *G11B 27/34* (2006.01)

(52) U.S. Cl.
  CPC ............. *G06T 5/70* (2024.01); *G06T 7/246* (2017.01); *G11B 27/34* (2013.01); *G06T 2200/24* (2013.01); *G06T 2207/10016* (2013.01); *G06T 2207/20092* (2013.01)

(58) Field of Classification Search
  None
  See application file for complete search history.

(56) References Cited

U.S. PATENT DOCUMENTS

| 2014/0036039 A1* | 2/2014 | Mcnally | H04N 13/275 348/47 |
|---|---|---|---|
| 2018/0309971 A1* | 10/2018 | Meyassed | H04N 13/122 |
| 2019/0045140 A1* | 2/2019 | Talmor Marcovici | G06F 3/012 |
| 2019/0269881 A1* | 9/2019 | Iida | A61M 21/02 |
| 2021/0233317 A1* | 7/2021 | Son | G16H 50/30 |
| 2022/0011854 A1* | 1/2022 | Kim | H04N 13/332 |

FOREIGN PATENT DOCUMENTS

| WO | 2010137104 A1 | 12/2010 | |
|---|---|---|---|
| WO | WO 2011/024269 * | 3/2011 | H04N 21/47 |

\* cited by examiner

*Primary Examiner* — Hung Q Dang

(74) *Attorney, Agent, or Firm* — Canon U.S.A., Inc. IP Division

(57) ABSTRACT

An image processing apparatus includes one or more memories and one or more processors. The one or more memories and the one or more processors are configured to detect a specific scene that causes visually induced motion sickness from a video for a predetermined display device, generate a partial video corresponding to a predetermined period including the detected specific scene in the video, and present the generated partial video.

23 Claims, 16 Drawing Sheets

FIG. 5

| Video Content | Motion of viewpoint position | | | Motion of shooting object | | | Sense of incompatibility between left and right | | | Unnaturalness of 3D appearance | | | Visually induced motion sickness characteristic video |
|---|---|---|---|---|---|---|---|---|---|---|---|---|---|
| Visually induced motion sickness scene intensity | HIGH | MEDIUM | LOW | HIGH | MEDIUM | LOW | HIGH | MEDIUM | LOW | HIGH | MEDIUM | LOW | |
| VIDEO CONTENT 4(A) | A | | B | C | | | | | D | | | E | A+C+D+E |
| VIDEO CONTENT 4(B) | F | | G | | | | | | | H | | | F+H |
| VIDEO CONTENT 4(C) | | I | | | | J | | | K | | | L | I+J+K+L |
| VIDEO CONTENT 4(D) | | | | | | | | | M | | | | M |

IMAGE PROCESSING APPARATUS, IMAGE PROCESSING METHOD, AND STORAGE MEDIUM

BACKGROUND

Field

The present disclosure relates to a technology used for watching videos with a specific display device such as a head-mounted display.

Description of the Related Art

In recent years, head-mounted displays (hereinafter referred to as HMDs) that are worn on the heads of viewers have become widespread, allowing viewers to easily watch videos full of realistic sensations. Furthermore, video distribution services are increasingly compatible with virtual reality (VR) videos, making it possible for anyone to distribute VR videos (360-degree videos, 180-degree videos).

The HMD is a device that presents video images while covering almost the entire visual field, and thus it is known, on the other hand, that viewers may suffer from "visually induced motion sickness" similar to motion sickness, such as headache, dizziness, and nausea, while watching images wearing the HMD.

In a case where shooting VR videos, camera operators skilled in handling videos carry out shooting with every possible precaution and care to avoid visually induced motion sickness. On the other hand, people who are not used to handling videos have little knowledge of visually induced motion sickness, making it difficult for them to carry out shooting with precautions and care to avoid visually induced motion sickness as much as possible. Therefore, some video content that is being distributed can cause severe visually induced motion sickness. In order to prevent viewers from suffering from visually induced motion sickness, appropriate processing of video content is necessary. In this regard, WO 2010/137104 discloses a technology for detecting a visually induced motion sickness scene that causes visually induced motion sickness from video data and processing the detected visually induced motion sickness scene, such as frame thinning.

SUMMARY

An image processing apparatus according to an aspect of the present disclosure includes one or more memories and one or more processors. The one or more memories and the one or more processors are configured to detect a specific scene that causes visually induced motion sickness from a video for a predetermined display device, generate a partial video corresponding to a predetermined period including the detected specific scene in the video, and present the generated partial video to the predetermined display device.

Further features of the present disclosure will become apparent from the following description of exemplary embodiments with reference to the attached drawings.

BRIEF DESCRIPTION OF THE DRAWINGS

FIG. 5 is a diagram for explaining processing performed by a generation unit.

DESCRIPTION OF THE EMBODIMENTS

Figure 1:
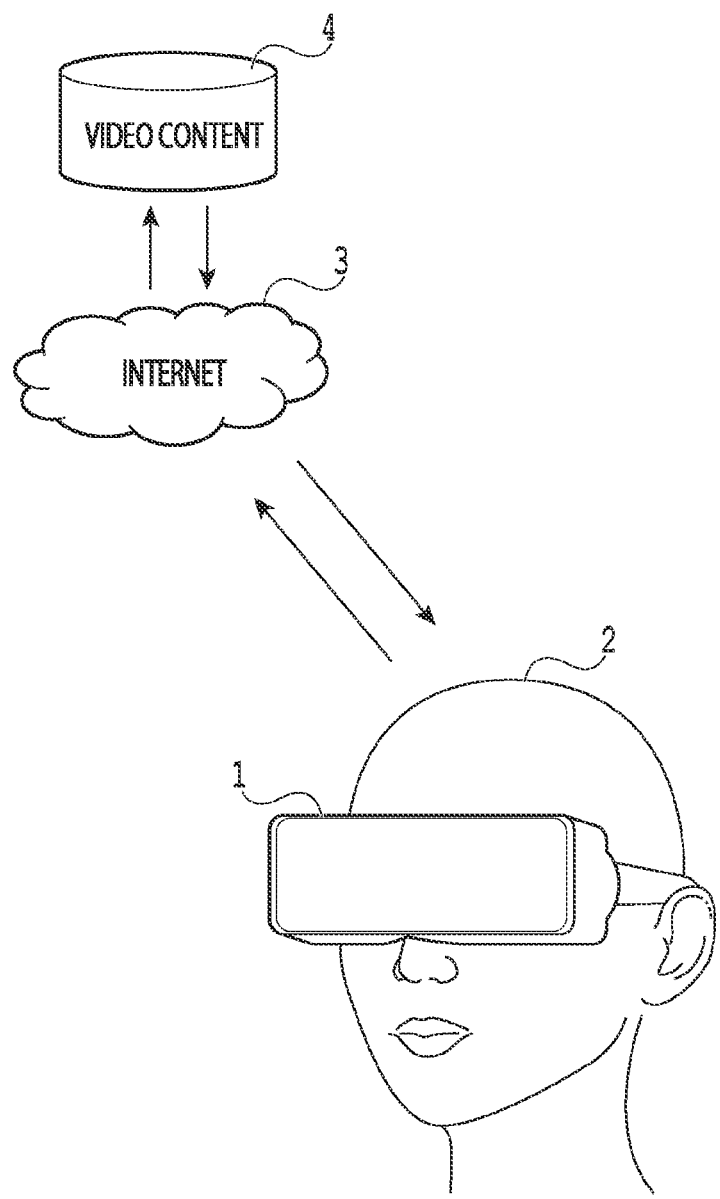
FIG. 1 is a diagram showing an overview of an image processing system.

Hereinafter, embodiments of the present disclosure will be described with reference to the drawings. The following embodiments do not limit the scope of claims and not all combinations of the features described in the embodiments are necessarily essential to means for solving the problems of the disclosure. The same constituent components will be described with the same reference numerals. Each process (step) in a flowchart is prefixed with "S".

However, there are many factors that can cause visually induced motion sickness from a video content in a case where watching a video wearing an HMD. Examples of such factors include the following: a difference in motion between a video and a viewer, such as a case where the viewer's body is at rest even though the video gives the feeling of being in motion; images of non-smooth movement; images that do not fuse into one 3D image; and the like. Furthermore, the types of images that are more likely to cause motion sickness and the degree of change in image that causes motion sickness vary from viewer to viewer. Therefore, even if a viewer wants to know whether a video that he/she wants to watch is likely to cause motion sickness before watching it, he or she has no way of knowing beforehand whether the video is likely to cause him/her motion sickness.

The technology disclosed in WO 2010/137104 described above is to detect a scene that is likely to cause visually induced motion sickness and then process it so that it becomes less likely to cause such motion sickness. This technology does not therefore make it possible to determine whether a video that a viewer wants to watch is likely to cause the motion sickness.

Embodiment 1

In the present embodiment, description is given of an embodiment in which a scene that causes visually induced motion sickness is detected in a video, a short video that shows the characteristics of visually induced motion sickness is generated by connecting the detected scenes that cause such motion sickness, and the short video is presented to a predetermined display device as a visually induced motion sickness characteristic video.

FIG. 1 is a diagram showing an overview of an image processing system according to the present embodiment. An HMD 1, which can be worn on the head of a viewer 2 to watch a video, connects to the Internet 3 to receive a video content 4 uploaded to an accessed video distribution site or the like and plays the video content 4 on an internal monitor (not shown) of the HMD 1. The video distribution site can be accessed via a web browser or the like that is executed by a CPU built into the HMD 1. It is assumed that the video content 4 has a frame rate of 24 fps to 60 fps, for example.

The viewer 2 accesses a video distribution site or the like via a web browser while wearing the HMD 1 and selects a video content 4 that he/she wants to watch, thereby receiving and watching the selected video content 4 that he/she wants to watch. In the present embodiment, an image processing apparatus 101 is configured as an application example of the HMD 1, and presents a short video (partial video) showing the characteristics of visually induced motion sickness from the video content 4 watched on the HMD 1 to the HMD 1 worn by the viewer 2 as a visually induced motion sickness characteristic video. Note that the image processing apparatus 101 is not limited to the application example to the HMD 1. For example, the image processing apparatus 101 may be a device different from the HMD 1 and applicable to a personal computer (PC), a tablet-type information terminal or the like used by the viewer. In this case, the PC or tablet-type information terminal is used to access a video distribution site and watch a desired video content from the video distribution site. Alternatively, the image processing apparatus 101 may be a device different from the HMD 1 and applicable to a server device or the like that provides services such as video distribution sites.

<Hardware Configuration of Image Processing Apparatus>

Figure 2:
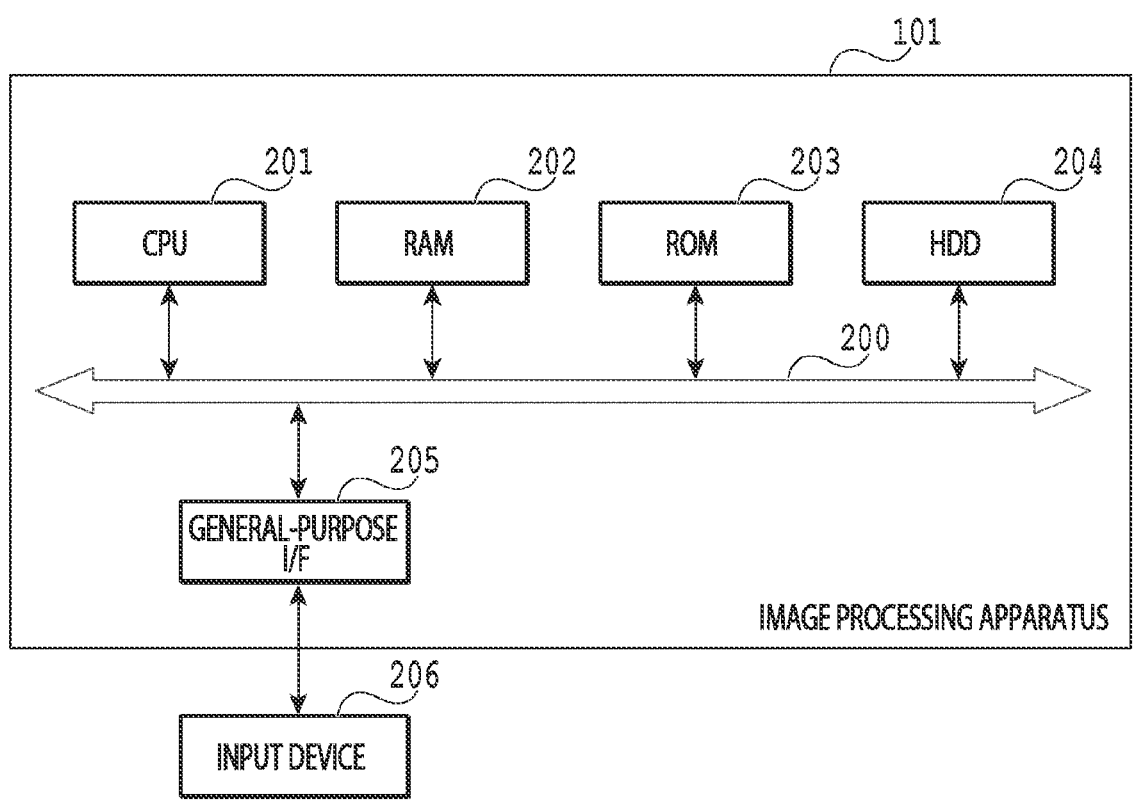
FIG. 2 is a diagram showing a hardware configuration example of an image processing apparatus.

FIG. 2 is a diagram showing a hardware configuration example of the image processing apparatus 101. The image processing apparatus 101 internally includes a CPU 201, a RAM 202, a ROM 203, an HDD 204, and a general-purpose interface (I/F) 205. These are connected to a main bus 200 so that data can be transmitted and received. The CPU 201 is a central processing unit that integrally controls the components in the image processing apparatus 101. The random access memory (RAM) 202 is a main memory of the CPU 201 and functions as a work area or the like. The read-only memory (ROM) 203 stores programs executed by the CPU 201. The hard disk drive (HDD) 204 stores applications executed by the CPU 201, data used for image processing, and the like. The general-purpose I/F 205 is, for example, a serial bus interface such as a USB or IEEE1394, which is connected to an input device 206, such as a keyboard, a mouse, or a controller. The viewer can transmit a command by operating the mouse or controller to the image processing apparatus 101 through those described above.

<Functional Configuration of Image Processing Apparatus>

Figure 3:
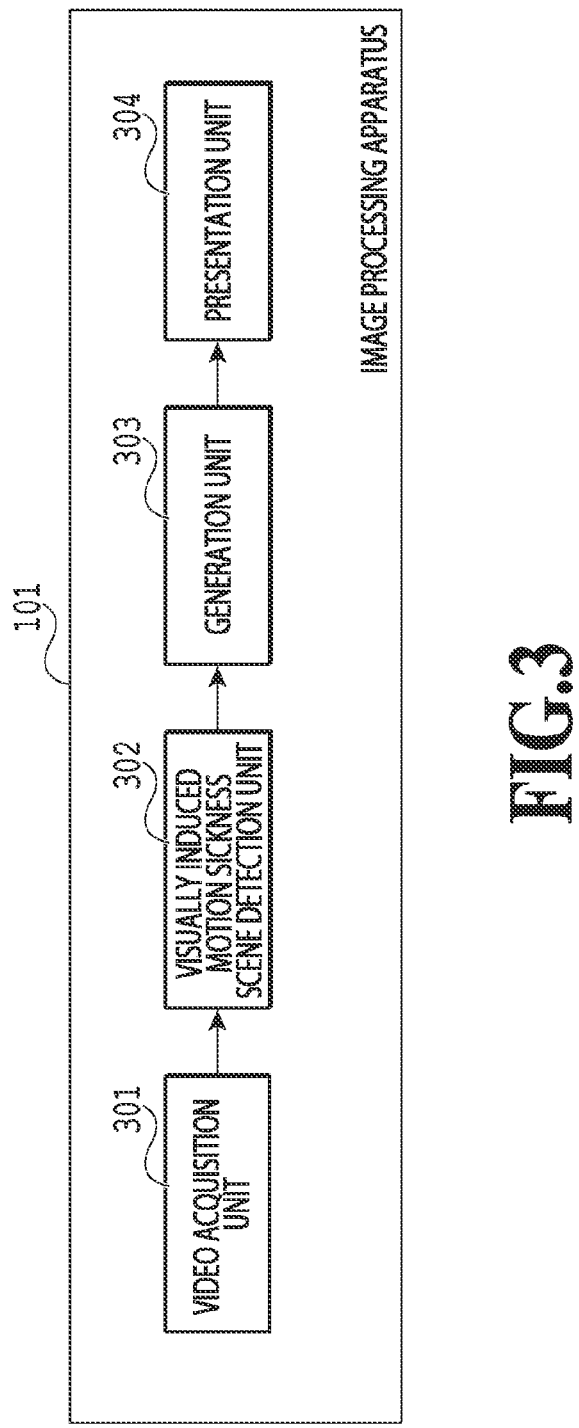
FIG. 3 is a block diagram showing a functional configuration example of the image processing apparatus.

FIG. 3 is a block diagram showing a functional configuration example of the image processing apparatus 101. The image processing apparatus 101 includes a video acquisition unit 301, a visually induced motion sickness scene detection unit 302, a generation unit 303, and a presentation unit 304.

The video acquisition unit 301 obtains a video content 4 to be watched on the HMD 1 according to an instruction from the CPU 201. Specifically, the video acquisition unit 301 accesses a video distribution site or the like via the Internet 3 to obtain a desired video content 4. The desired video content to be obtained may be a specific video content 4 designated by the viewer 2, or may be an arbitrary video content group including a plurality of video contents.

The visually induced motion sickness scene detection unit 302 detects a partial video that may cause visually induced motion sickness (hereinafter referred to as a visually induced motion sickness scene) in the video content 4 obtained by the video acquisition unit 301. In processing of detecting visually induced motion sickness scenes, characteristics of the factors that cause visually induced motion sickness are first detected, including "magnitude of motion of viewpoint position", "magnitude of motion of shooting object", "sense of incompatibility between left and right" and "unnaturalness of 3D image". Then, short videos (partial videos) of about a few seconds (predetermined period) corresponding to each of the visually induced motion sickness scenes with the above characteristics detected are extracted from the video content and then connected for each video content to generate a visually induced motion sickness video showing the visually induced motion sickness characteristics. The visually induced motion sickness video thus generated is then stored in the HDD 204 or a cloud server (not shown).

<Details on Factors for Visually Induced Motion Sickness>

Among the visually induced motion sickness factors, the "magnitude of motion of viewpoint position" is information indicating the magnitude of motion of an imaging device during video shooting. In a case where the viewer 2 is watching on the HMD 1 a video in which a camera itself that is shooting a video content 4 is moving, the viewer 2 can visually obtain information as if he/she were making the same motion as the camera. It is said that the greater the difference between the visually obtained motion and the actual body motion of the viewer 2, the more likely the visually induced motion sickness is to occur. In the present embodiment, it is determined that the larger the motion of the viewpoint position in the video content 4, the higher the intensity of visually induced motion sickness.

Among the visually induced motion sickness factors, the "magnitude of motion of shooting object" is information indicating the magnitude of motion of a shooting object. In the case of a video in which the camera shooting a video content 4 stays still but the shooting object makes a big motion, the motion of the entire view of the viewer 2 changes drastically, easily causing visually induced motion sickness. An example of such a case is a time-lapse video in which the entire video moves at high speed. In the present embodiment, it is determined that the larger the motion of the shooting object in the video content 4, the higher the intensity of visually induced motion sickness.

Among the visually induced motion sickness factors, the "sense of incompatibility between left and right" is information indicating a difference between left and right images projected by the HMD 1 to the left and right eyes of the viewer 2. Specifically, the information indicating the difference between the left and right images includes information indicating a brightness difference, a chromaticity difference, and a vertical displacement between the left eye image and the right eye image. The viewer 2 visually recognizes an image by fusing images projected on the retina of his/her left eye and on the retina of his/her right eye. In normal vision, the images seen by the left and right eyes represent the same object, and thus have the same brightness and chromaticity, leaving no vertical displacement, except for a tilt of the eyes. However, as for the image displayed by the HMD 1 on a display device corresponding to the left eye and the image displayed by the HMD 1 on a display device corresponding to the right eye, such images can be different between the left and right eyes, resulting in a video that is different from what is normally seen and leading to visually induced motion sickness. In the present embodiment, it is determined that the greater the brightness difference, chromaticity difference, and vertical displacement between the left and right images, the higher the intensity of visually induced motion sickness.

Among the visually induced motion sickness factors, the "unnaturalness of 3D appearance" is information indicating the amount of protrusion of a 3D image. Since the left and right human eyes are separated by about 5 cm to 7 cm, there is a horizontal shift (binocular parallax) between the images projected in the left and right eyes. This binocular parallax is used as a clue to perceive the depth of an object. In a case where the binocular parallax is large, the distance to a visual object is perceived to be short. Furthermore, humans unconsciously adjust the thickness of their crystalline lenses and the positions of their eyeballs in a case where seeing things. For example, in a case where a visual object is close by, the eyeballs are moved inward (cross-eyed) and the crystalline lenses are adjusted to be thick. In stereo-photographed images, in a case where a camera is close to an imaging object, the binocular parallax increases and the object appears to pop out, compared to an imaging object with a small binocular parallax.

With normal human vision, even in a case where a visual object is located at a short distance, the object can be seen by moving the eyeballs inward and thus fusing images. In stereo photographing, on the other hand, since a camera position is fixed, in a case where the distance between the camera and the imaging object reaches a certain value or more, the resultant image includes an area where images cannot be fused (non-fusion area). Such an image including the non-fusion area looks different from normal vision, leading to visually induced motion sickness. Furthermore, in a case where the pop-out amount is large even if images can be fused, it may cause eye fatigue and visually induced motion sickness. In the present embodiment, it is determined that the greater the binocular parallax of a 3D image, the higher the intensity of visually induced motion sickness.

<How to Detect Visually Induced Motion Sickness Scene>

The "magnitude of motion of viewpoint position" and "magnitude of motion of shooting object" described above can be analyzed by an optical flow of the video content 4. The optical flow is obtained by extracting feature points from a video and expressing motions of the feature points between video frames using vectors.

Figure 4A:
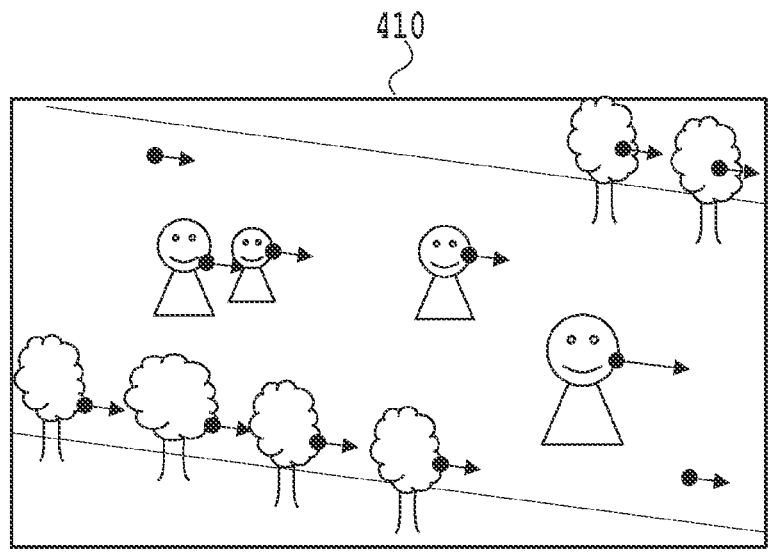
FIGS. 4A and 4B are explanatory diagrams of a difference in movement between a viewpoint position and a photographic subject.
Figure 4B:
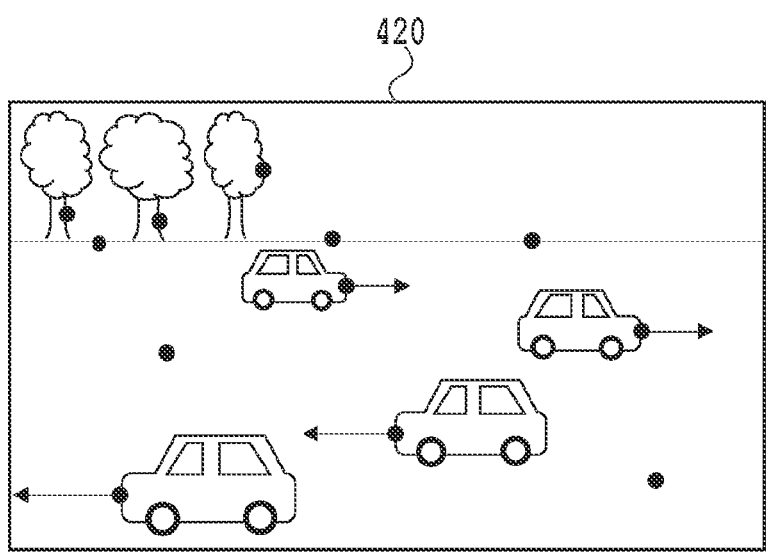

With reference to FIGS. 4A and 4B, description is given of a difference in optical flow between the motion of the viewpoint position and the motion of the shooting object. FIGS. 4A and 4B are diagrams each showing one frame of different video contents 4. FIG. 4A shows one frame of a video content 4 in a case where the viewpoint position moves. FIG. 4B shows one frame of a video content 4 in a case where the shooting object moves. The black dots shown in FIGS. 4A and 4B indicate feature points extracted from arbitrary frames, and the arrows extending from the black dots indicate optical flows. The direction of the arrows indicate the movement direction of the feature points, and the length of the arrow indicates the movement amount of the feature point. In other words, the longer the length of the arrow, the larger the movement amount between frames. Note that a plurality of frames for calculating the optical flow here may be frames that come before and after each other, or frames obtained at specific intervals.

In the video content where the viewpoint position moves, as shown in FIG. 4A, all feature points extracted from the entire area of one frame of the video are in motion, and thus all feature points have a movement amount. There is a difference in movement amount between an object located far away from the viewpoint position and an object located near the viewpoint position. However, since the camera (imaging device) is in motion at the time of shooting, all feature points have the movement amount in the entire area of the shot image (one frame).

In the video content where the shooting object moves, as shown in FIG. 4B, a plurality of feature points extracted from the entire area of one frame of the video include feature points that move between frames and have a movement amount, and feature points that do not move between frames and have no movement amount. For example, feature points on cars move between frames and have the movement amount, but feature points on trees and a road do not move between frames and have no movement amount.

Due to such differences in feature, it is possible to determine whether the movement is of the viewpoint position or of the shooting object, according to the ratio of feature points having the movement amount in the video content 4, and to obtain the movement amount by calculating the optical flows. Therefore, the visually induced motion sickness scene detection unit 302 detects a video where the average value of optical flows between frames exceeds an arbitrary threshold value as a visually induced motion sickness scene.

Also, weighting may be applied depending on the direction of optical flow. It is said that humans tend to have motion sickness more easily in a case where their viewpoint moves in the vertical direction than in a case where it moves in the horizontal direction. Therefore, the motion in the vertical direction may be weighted more than that in the horizontal direction.

The "sense of incompatibility between left and right" described above is determined from the brightness difference and chrominance difference between left and right images, and the amount of vertical displacement. As for the brightness difference and chrominance difference, a brightness distribution and a color distribution can be calculated for each of the left and right images, and the determination can be made from the difference between the left and right images. As for the vertical displacement amount, an object that is the main subject, for example, can be detected to calculate the amount of vertical displacement of the detected position of the object between the left and right images. In a case where these difference values are each larger than an arbitrary threshold value, the scene is detected as a visually induced motion sickness scene.

The "unnaturalness of 3D appearance" described above is determined based on the amount of binocular parallax of the object detected in left and right images. In a case where the amount of binocular parallax of the same object detected in the left and right images is larger than an arbitrary threshold value, the scene is detected as a visually induced motion sickness scene.

The visually induced motion sickness scene detection unit 302 thus detects a visually induced motion sickness scene that causes visually induced motion sickness in the video content 4 with respect to the above characteristics. Those characteristics are, for example, the "motion of viewpoint position", "motion of shooting object", "sense of incompatibility between left and right", and "unnaturalness of 3D appearance" described above. In detection of visually induced motion sickness scenes, a plurality of threshold values are set in stages as described above, and visually induced motion sickness scenes are detected so that the probability of causing visually induced motion sickness can be distinguished by intensity, such as high, medium, and low. That is, in a case where the detected characteristic is larger than a first threshold T11, it is detected as a visually induced motion sickness scene with a "high" intensity. In a case where the detected characteristic is less than or equal to the first threshold T11 but is larger than a second threshold T12, it is detected as a visually induced motion sickness scene with a "medium" intensity. In a case where the detected characteristic is smaller than the second threshold T12 but larger than a third threshold T13, it is detected as a visually induced motion sickness scene with a "low" intensity. In a case where the detected characteristic is smaller than the third threshold T13, the visually induced motion sickness scene intensity is "none" and it is not detected as a visually induced motion sickness scene. Note that the threshold values T11, T12, and T13 may vary by video content, by user as a viewer, or by factor for visually induced motion sickness. The visually induced motion sickness scenes once detected are stored in the HDD 204, a cloud server (not shown), or the like in association with the video content 4, and may be read and presented in a case where they are to be displayed again.

The generation unit 303 uses the visually induced motion sickness scene detected by the visually induced motion sickness scene detection unit 302 to generate a visually induced motion sickness characteristic video that indicates the type and intensity of the visually induced motion sickness scene included in the video content 4. That is, the generation unit 303 generates a partial video of the video content 4 that corresponds to a predetermined period including the detected specific scene.

<Processing by Generation Unit>

FIG. 5 is a diagram for explaining processing performed by the generation unit 303. A table 500 shows the relationship between video contents 4 and detected visually induced motion sickness scenes. In the table 500, a plurality of video contents 4 are shown in the row direction, and the types of visually induced motion sickness scenes and the motion sickness susceptibility level are shown in the column direction. The alphabets in the table 500 indicate visually induced motion sickness scenes detected by the visually induced motion sickness scene detection unit 302.

Specifically, a video content 4(A) 521 includes a visually induced motion sickness scene A with a "high" level and a visually induced motion sickness scene B with a "low" level for the "motion of viewpoint position" 511. The video content 4(A) 521 includes a visually induced motion sickness scene C with a "high" level for the "motion of shooting object" 512. The video content 4(A) 521 includes a visually induced motion sickness scene D with a "low" level for the "sense of incompatibility between left and right" 513 and a visually induced motion sickness scene E with a "low" level for the "unnaturalness of 3D appearance" 514. The table also shows that the motion sickness susceptibility level is higher in the visually induced motion sickness scene A of the "motion of viewpoint position" than in the visually induced motion sickness scene B of the "motion of viewpoint position".

A video content 4(B) 522 includes a visually induced motion sickness scene F with a "high" level and a visually induced motion sickness scene G with a "low" level for the "motion of viewpoint position" 511. The video content 4(B) 522 includes a visually induced motion sickness scene H with a "high" level for the "unnaturalness of 3D appearance" 514.

A video content 4(C) 523 includes a visually induced motion sickness scene I with a "medium" level for the "motion of viewpoint position" 511 and a visually induced motion sickness scene J with a "low" level for the "motion of shooting object" 512. The video content 4(C) 523 includes a visually induced motion sickness scene K with a "low" level for the "sense of incompatibility between left and right" 513 and a visually induced motion sickness scene L with a "low" level for the "unnaturalness of 3D appearance" 514. A video content 4(D) 524 includes a visually induced motion sickness scene M with a "low" level for the "sense of incompatibility between left and right" 513.

The generation unit 303 generates a visually induced motion sickness characteristic video 530 by connecting partial images corresponding to a predetermined period including a visually induced motion sickness scene (specific scene) with the highest visually induced motion sickness intensity from each visually induced motion sickness factor. For example, in a case where there are a plurality of visually induced motion sickness scenes with a "high" intensity for the same visually induced motion sickness characteristic, a visually induced motion sickness characteristic video may be generated from any one of the plurality of visually induced motion sickness scenes. FIG. 5 shows that a video 531 is generated as a visually induced motion sickness characteristic video by connecting partial images corresponding to predetermined periods including the visually induced motion sickness scene A, visually induced motion sickness scene C, visually induced motion sickness scene D, and visually induced motion sickness scene E from the video content 4(A) 521. A video 532 is generated as a visually induced motion sickness characteristic video by connecting partial images corresponding to predetermined periods including the visually induced motion sickness scene F and visually induced motion sickness scene H from the video content 4(B) 522. A video 533 is generated as a visually induced motion sickness characteristic video by connecting partial images corresponding to predetermined periods including the visually induced motion sickness scene I, visually induced motion sickness scene J, visually induced motion sickness scene K, and visually induced motion sickness scene L from the video content 4(C) 523. From the video content 4(D) 524, partial images corresponding to a predetermined period including a video 534 of the visually induced motion sickness scene M are generated as a visually induced motion sickness characteristic video.

Note that the method for generating visually induced motion sickness characteristic videos is not limited to the above. For example, only one visually induced motion sickness scene with the highest intensity may be selected from the video content 4, regardless of the visually induced motion sickness factor, and partial images corresponding to a predetermined period including the selected visually induced motion sickness scene with the highest intensity may be generated as a visually induced motion sickness characteristic video. A visually induced motion sickness characteristic video may be generated by connecting only partial images corresponding to a predetermined period including a visually induced motion sickness scene determined to have a high visually induced motion sickness intensity. Alternatively, a visually induced motion sickness characteristic video whose color is changed may be generated by changing its hue, or a visually induced motion sickness characteristic video that is blurred using a filter or the like may be generated. That is, a visually induced motion sickness characteristic video may be generated that allows the user to recognize the susceptibility to visually induced motion sickness but makes it difficult to identify the contents of the video content 4.

The presentation unit 304 presents the visually induced motion sickness characteristic video (partial video) generated by the generation unit 303 to the HMD 1 worn by the viewer 2. The presentation unit 304 presents the visually induced motion sickness characteristic video to the HMD 1 worn by the viewer 2 via a UI screen that displays the video, for example.

<UI Screen>

Figure 6:
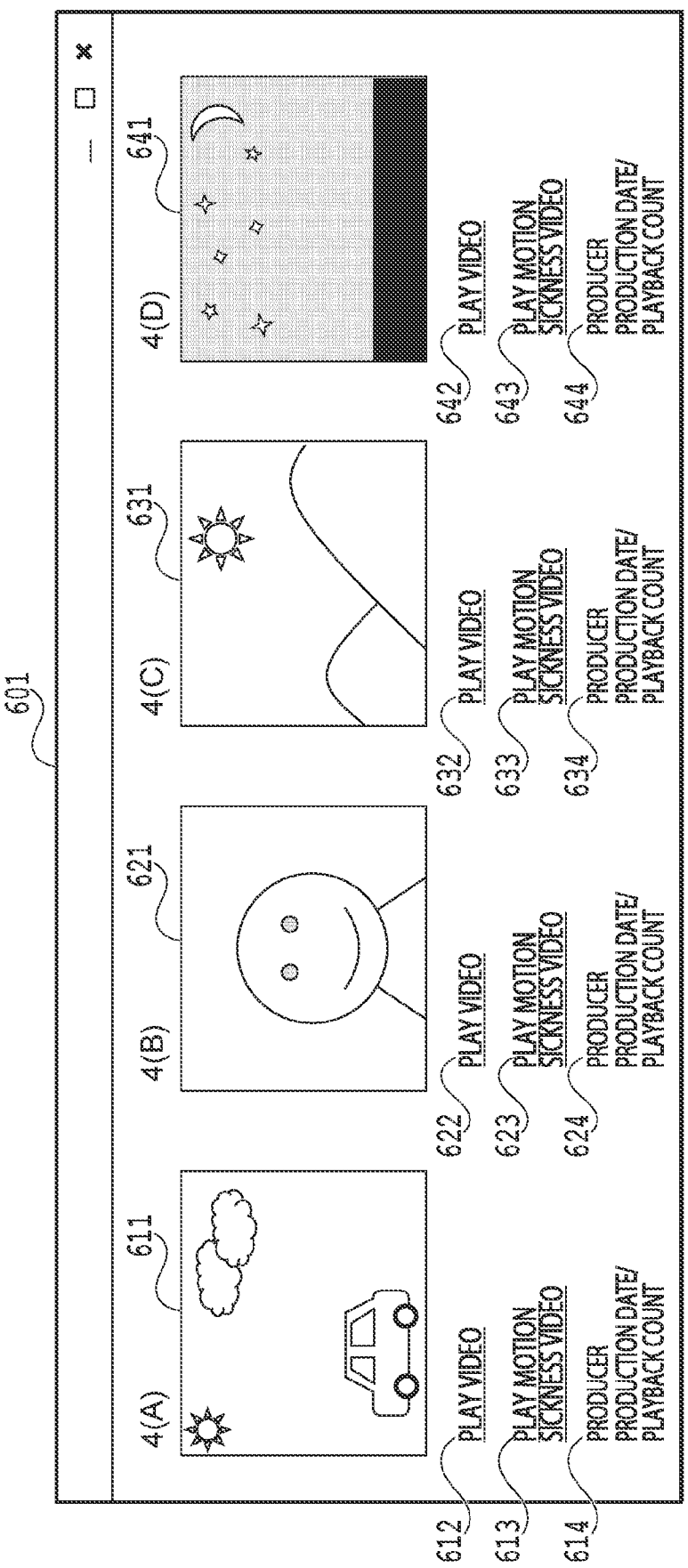
FIG. 6 is a diagram showing a UI screen example of presenting a video content.

FIG. 6 is a diagram showing an example of a user interface (UI) screen presented by the presentation unit 304. A UI screen 601, which is the main screen of the presentation unit, presents a plurality of video contents 4. FIG. 6 shows four video contents 4, a video content 4(A), a video content 4(B), a video content 4(C), and a video content 4(D). The UI screen 601 displays contents in accordance with the video content 4(A), including a thumbnail display screen 611, a video play button 612, a visually induced motion sickness characteristic video play button 613, and a summary information display area 614.

The UI screen 601 also displays contents in accordance with the video content 4(B), including a thumbnail display screen 621, a video play button 622, a visually induced motion sickness characteristic video play button 623, and a summary information display area 624, as in the case of the video content 4(A).

The UI screen 601 also displays contents in accordance with the video content 4(C), including a thumbnail display screen 631, a video play button 632, a visually induced motion sickness characteristic video play button 633, and a summary information display area 634, as in the case of the video content 4(A).

The UI screen 601 also displays contents in accordance with the video content 4(D), including a thumbnail display screen 641, a video play button 642, a visually induced motion sickness characteristic video play button 643, and a summary information display area 644, as in the case of the video content 4(A).

The thumbnail display screens 611, 621, 631, and 641 display thumbnail images showing the characteristics of the corresponding video contents 4(A), (B), (C), and (D), respectively. The thumbnail images may be images created in advance by producers of the corresponding video contents 4(A), (B), (C), and (D). Alternatively, the thumbnail image may be an image set by cutting out an arbitrary frame from the corresponding video content 4(A), (B), (C), or (D).

In a case where the video play button (second GUI) 612, 622, 632, and 642 are selected (pressed) by the viewer 2, the corresponding video contents 4(A), (B), (C), and (D) are played. Although "Play Video" is displayed on the UI screen 601 as a character string indicating a button to play a video, some embodiments are not limited thereto. For example, a button with a character string indicating the title of video content may be used, and in a case where the button is pressed, the corresponding video content 4(A), (B), (C) or (D) may be played.

In a case where the visually induced motion sickness characteristic video play buttons (first GUI) 613, 623, 633, and 643 are selected (pressed) by the viewer 2, a corresponding video, that is, a visually induced motion sickness characteristic video generated by the generation unit 303, is played.

The summary information display areas 614, 624, 634, and 644 are areas showing various summary information about the corresponding video contents 4(A), (B), (C), and (D). The information displayed in the summary information display areas 614, 624, 634, and 644 includes the names of producers, production date, video playback count, and the like of the corresponding video contents 4(A), (B), (C), and (D). These summary information are stored as data linked to the video contents 4(A), (B), (C), and (D).

In a case where the viewer 2 presses the visually induced motion sickness characteristic video play button selected on the UI screen 601, a corresponding visually induced motion sickness characteristic video is played. The viewer 2 can thus watch a visually induced motion sickness characteristic video of a video content 4, which corresponds to the selected video content 4 and has a predetermined intensity for a predetermined factor. In a case where the video play button 612, 622, 632, or 642 is selected and pressed without displaying the visually induced motion sickness characteristic video play buttons on the UI screen 601, a visually induced motion sickness characteristic video corresponding to the video content 4 may be played before the video content 4 is played.

This allows the viewer 2 to know the motion sickness factor and intensity of the video content 4 by watching the visually induced motion sickness characteristic video corresponding to the video content 4 before playing the video content 4. In order to avoid developing visually induced motion sickness by watching such a visually induced motion sickness characteristic video, the visually induced motion sickness characteristic video may be displayed and played at a smaller angle of view than that of the video content 4. That is, the played visually induced motion sickness characteristic video (partial video) may be displayed and played at a smaller angle of view than that of the thumbnail image.

<Flow of Processing Executed by Image Processing Apparatus 101>

Figure 7:
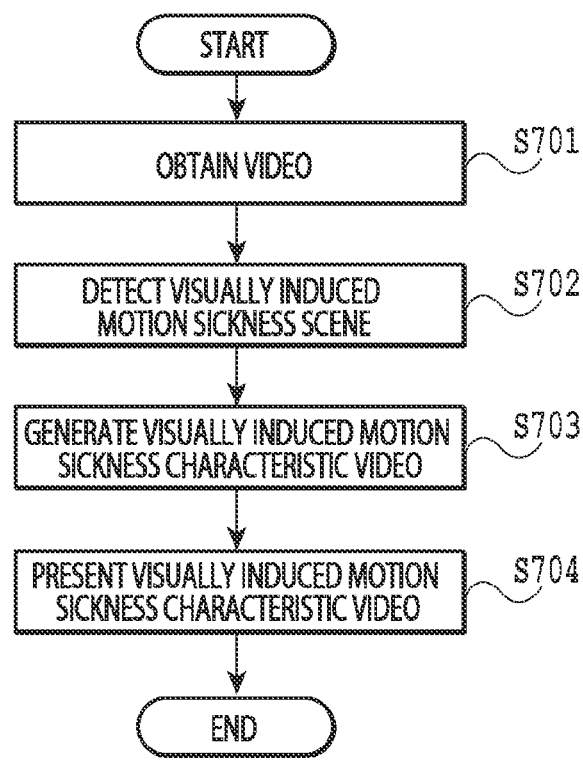
FIG. 7 is a flowchart showing a flow of processing executed by the image processing apparatus.

FIG. 7 is a flowchart showing a flow of processing executed by the image processing apparatus 101 according to the present embodiment. The CPU 201 reads a program to implement the flowchart shown in FIG. 7, which is stored in the ROM 203 or HDD 204, and executes the program using the RAM 202 as a work area. This allows the CPU 201 to function as each functional configuration shown in FIG. 3.

In S701, the video acquisition unit 301 obtains a video content 4 that the viewer 2 watches on the HMD 1. The video acquisition unit 301 obtains a video content desired by the viewer from a video distribution site, for example.

In S702, the visually induced motion sickness scene detection unit 302 detects visually induced motion sickness scenes corresponding to a plurality of visually induced motion sickness factors in the video content 4 obtained in S701. For example, visually induced motion sickness scenes corresponding to the "magnitude of motion of viewpoint position", "magnitude of motion of shooting object", "sense of incompatibility between left and right", and "unnaturalness of 3D image", respectively, are detected.

In S703, the generation unit 303 generates a video, as a visually induced motion sickness characteristic video, by connecting partial videos corresponding to a predetermined period including a visually induced motion sickness scene with the highest intensity among the visually induced motion sickness scenes detected in S702, out of the video content 4 obtained in S701.

In S704, the presentation unit 304 uses the UI screen 601, for example, to present the visually induced motion sickness characteristic video generated in S703 to the HMD 1 worn by the viewer 2 in association with the corresponding video content. After completing the process of S704, the processing shown in FIG. 7 ends.

As described above, according to the present embodiment, visually induced motion sickness scenes that cause visually induced motion sickness in a video content are detected, and visually induced motion sickness characteristic images are generated by connecting the visually induced motion sickness scenes with the highest intensity among the visually induced motion sickness factors and then presented to the predetermined display device worn by the viewer. This makes it possible for the viewer who does not even know what type of video is likely to cause him/her motion sickness to determine whether a desired video content is one that he/she develops motion sickness with, by watching a visually induced motion sickness characteristic video corresponding to the desired video content. Therefore, since the viewer can obtain the above determination result before watching the video content, visually induced motion sickness can be effectively prevented.

Note that the video content 4 (video) is not limited to those for a head-mounted display. The video content 4 (video) may be those for a 3D display device, for example.

Embodiment 2

In Embodiment 1, the description has been given of the embodiment where visually induced motion sickness scenes that cause visually induced motion sickness in a video content are detected, and a visually induced motion sickness characteristic video is generated by connecting the visually induced motion sickness scenes based on a visually induced motion sickness factor and its intensity and then presented to the predetermined display device worn by the viewer. Since the visually induced motion sickness characteristic video in Embodiment 1 is a video extracted from the video content 4, there is a possibility that the most exciting scene in the video content 4 is selected. In such a case, the viewer 2 will unexpectedly learn of important scenes in the video content 4 if he/she watches the visually induced motion sickness characteristic video before watching the video content 4. Therefore, in the present embodiment, an embodiment will be described in which a video different from the video content 4 is presented as a visually induced motion sickness characteristic video. Note that an image processing apparatus 101 according to the present embodiment has the same hardware configuration as that in Embodiment 1, and description thereof will be omitted.

<Functional Configuration of Image Processing Apparatus>

Figure 8A:
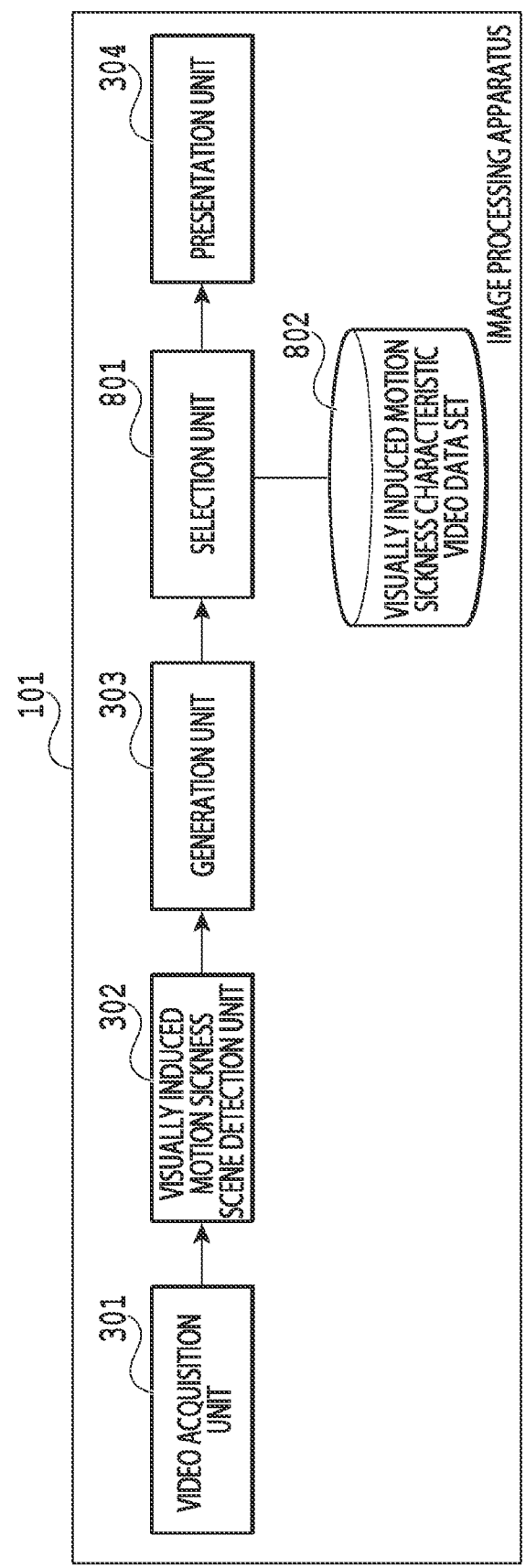
FIGS. 8A and 8B are block diagrams showing a functional configuration example of an image processing apparatus.
Figure 8B:
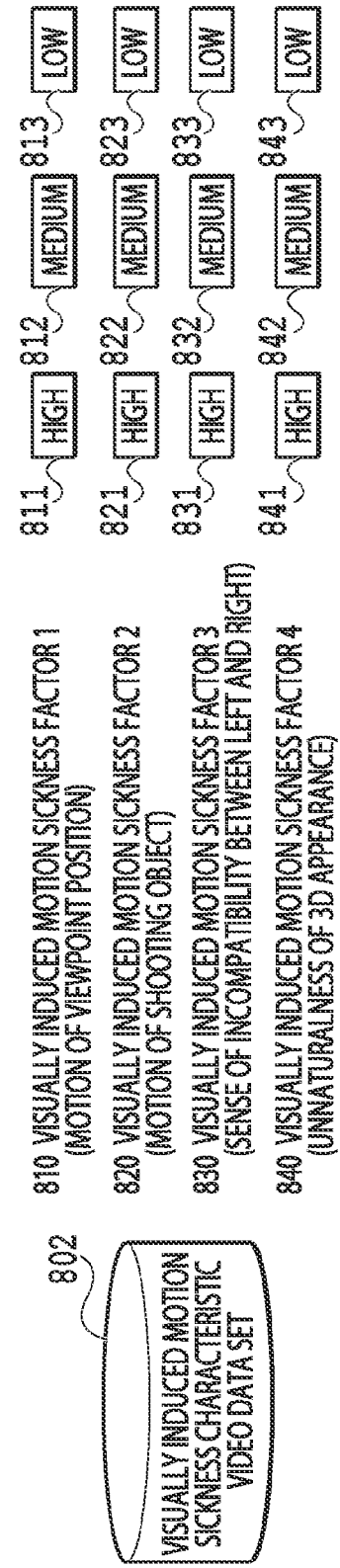

FIGS. 8A and 8B are block diagrams showing a functional configuration example of an image processing apparatus included in an image processing system according to the present embodiment. The image processing apparatus 101 according to the present embodiment includes a video acquisition unit 301, a visually induced motion sickness scene detection unit 302, a generation unit 303, and a presentation unit 304, as in Embodiment 1. These functional units perform the same processing as in Embodiment 1, and thus description thereof will be omitted. The image processing apparatus 101 according to the present embodiment further includes a selection unit 801 and a visually induced motion sickness characteristic video data set 802.

The selection unit 801 selects a visually induced motion sickness characteristic video indicating the same characteristics as those in a visually induced motion sickness characteristic video generated by the generation unit 303, from the visually induced motion sickness characteristic video data set 802. Here, the "same characteristics" refer to the fact that the visually induced motion sickness factor and its intensity are the same. For example, the generation unit 303 gives flags (information), each corresponding to the visually induced motion sickness factor and its intensity, to a visually induced motion sickness characteristic video. Then, the selection unit 801 can select an alternative video corresponding to a video factor of the visually induced motion sickness characteristic video and its intensity from the visually induced motion sickness characteristic video data set 802 by referring to the flag given to the visually induced motion sickness characteristic video.

The visually induced motion sickness characteristic video data set 802 prestores visually induced motion sickness characteristic videos, each corresponding to the visually induced motion sickness factor and its intensity. These visually induced motion sickness characteristic videos are video data unrelated to the video content 4. Any video data set may be used that covers the visually induced motion sickness factors and intensities thereof in the column direction shown in FIG. 5.

For example, data 810 corresponding to the visually induced motion sickness factor "motion of viewpoint position" includes data 811 of a visually induced motion sickness scene with a "high" intensity, data 812 of a visually induced motion sickness scene with a "medium" intensity, and data 813 of a visually induced motion sickness scene with a "low" intensity.

Data 820 corresponding to the visually induced motion sickness factor "magnitude of motion of shooting object" includes data 821 of a visually induced motion sickness scene with a "high" intensity, data 822 of a visually induced motion sickness scene with a "medium" intensity, and data 823 of a visually induced motion sickness scene with a "low" intensity.

Data 830 corresponding to the visually induced motion sickness factor "sense of incompatibility between left and right" includes data 831 of a visually induced motion sickness scene with a "high" intensity, data 832 of a visually induced motion sickness scene with a "medium" intensity, and data 833 of a visually induced motion sickness scene with a "low" intensity.

Data 840 corresponding to the visually induced motion sickness factor "unnaturalness of 3D image" includes data 841 of a visually induced motion sickness scene with a "high" intensity, data 842 of a visually induced motion sickness scene with a "medium" intensity, and data 843 of a visually induced motion sickness scene with a "low" intensity.

Note that the visually induced motion sickness characteristic video data set 802 may be prestored in the HDD 204, or may be stored in a cloud server on the Internet 3. In the video content 4(A) of FIG. 5, in a case where a visually induced motion sickness characteristic video is a video generated by connecting the visually induced motion sickness scene A, visually induced motion sickness scene C, visually induced motion sickness scene D, and visually induced motion sickness scene E, the selection unit 801 selects the following video. Specifically, the selection unit 801 selects a video with "motion of viewpoint position": high, "motion of shooting object": high, "sense of incompatibility between left and right": low, and "unnaturalness of 3D appearance": low. These images are connected to generate a visually induced motion sickness characteristic video, and the visually induced motion sickness characteristic video is sent to the presentation unit 304.

<Flow of Processing Executed by Image Processing Apparatus 101>

Figure 9:
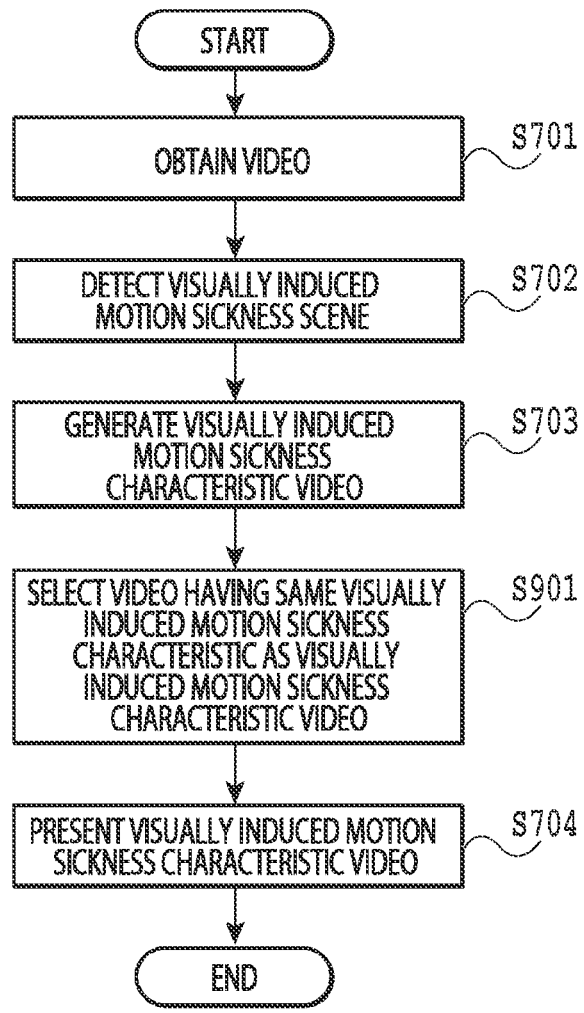
FIG. 9 is a flowchart showing a flow of processing executed by the image processing apparatus.

FIG. 9 is a flowchart showing a flow of processing executed by the image processing apparatus 101 according to the present embodiment. The processing from S701 to S703 is the same as in Embodiment 1, and description thereof will be omitted. After completing the process of S703, the processing moves to S901.

In S901, the selection unit 801 selects, from the visually induced motion sickness characteristic video data set 802, video data having the same visually induced motion sickness factor and intensity as those of the visually induced motion sickness characteristic video generated in S703.

In S704, the presentation unit 304 presents the visually induced motion sickness characteristic video selected in S901 to the HMD 1 worn by the viewer 2. After completing the process of S704, the processing shown in FIG. 9 ends.

As described above, according to the present embodiment, the visually induced motion sickness characteristic video having the same characteristics and intensity as those of the visually induced motion sickness characteristic video generated from the desired video content 4 is selected from the visually induced motion sickness characteristic video data set 802 as the visually induced motion sickness characteristic video. This can prevent the viewer from finding out the contents of the desired video content, even if he/she watches the visually induced motion sickness characteristic video before watching the desired video content, since the watched visually induced motion sickness characteristic video is generated from a video content different from the desired video content. This makes it possible to eliminate the possibility of spoiling the viewer's video experience while effectively preventing visually induced motion sickness.

Embodiment 3

In Embodiment 2, the description has been given of the embodiment where a visually induced motion sickness characteristic video generated based on a video different from the desired video content 4 is selected and presented as the visually induced motion sickness characteristic video. In the present embodiment, an embodiment will be described in which input from a viewer is received for a visually induced motion sickness characteristic video. An image processing apparatus according to the present embodiment has the same hardware configuration as that in Embodiment 1, and description thereof will be omitted.

<Functional Configuration of Image Processing Apparatus>

Figure 10:
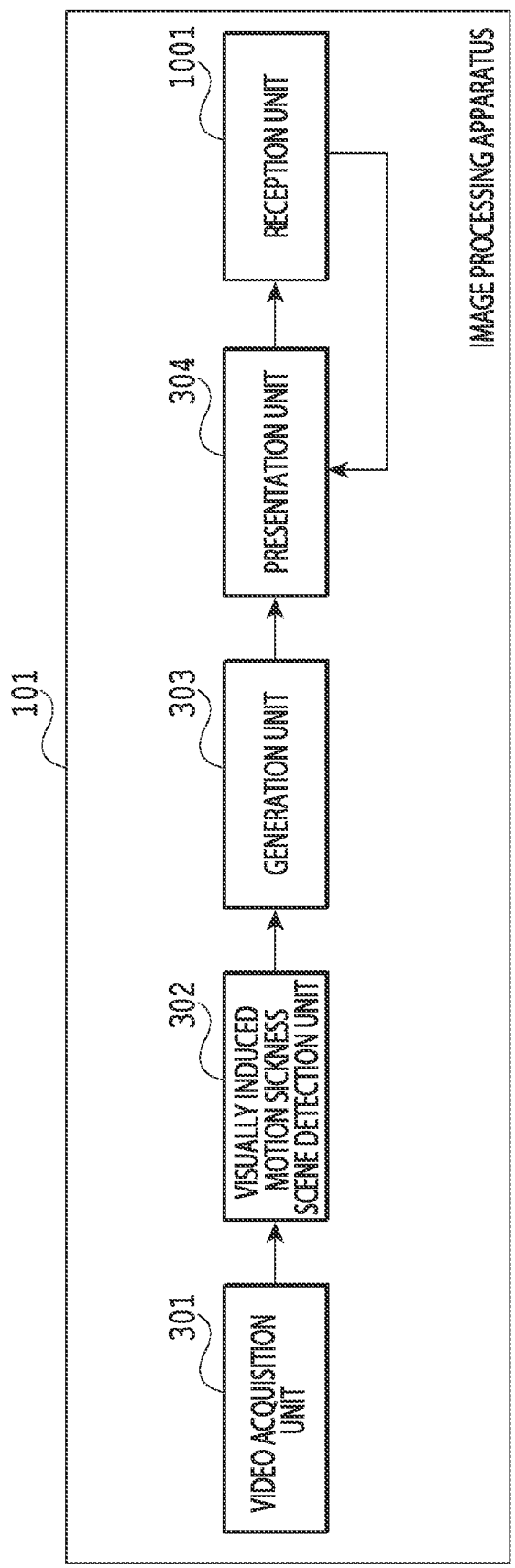
FIG. 10 is a block diagram showing a functional configuration example of an image processing apparatus.

FIG. 10 is a block diagram showing a functional configuration example of an image processing apparatus included in an image processing apparatus system according to the present embodiment. An image processing apparatus 101 according to the present embodiment includes a video acquisition unit 301, a visually induced motion sickness scene detection unit 302, and a generation unit 303, as in Embodiment 1. These functional units perform the same processing as in Embodiment 1, and thus description thereof will be omitted. The image processing apparatus 101 according to the present embodiment further includes a reception unit 1001 and a presentation unit 304. The presentation unit 304 of the present embodiment performs processing that is partially different from that of Embodiment 1.

The reception unit 1001 receives input from the viewer 2 regarding a visually induced motion sickness characteristic video presented to the HMD 1 worn by the viewer 2 by the presentation unit 304. For example, a UI screen is presented to the HMD 1 worn by the viewer 2 at a timing after the visually induced motion sickness characteristic video is watched, and the reception unit 1001 receives input for a message displayed on the UI screen.

<UI Screen>

Figure 11:
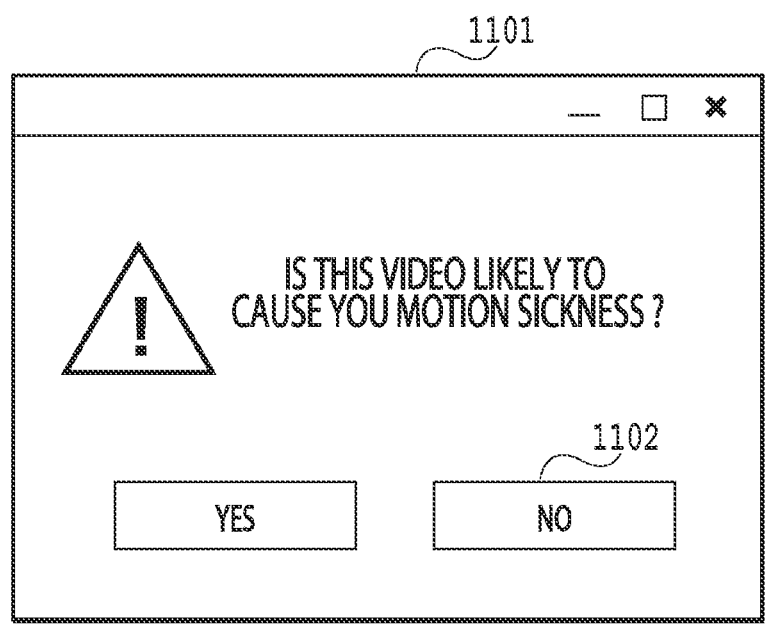
FIG. 11 is a diagram showing a UI screen example of receiving input from a viewer.

FIG. 11 is a diagram showing an example of a UI screen to receive a feedback from a user regarding whether the watched video is likely to cause motion sickness. A UI screen 1101, which is the main screen of the reception unit, displays a message asking whether the visually induced motion sickness characteristic video is likely to cause motion sickness. The UI screen 1101 includes a selection button 1102 of "Yes" or "No" to respond to the message. The selection button 1102 of "Yes" is selected by the user as the viewer 2 in a case where the viewer determines that the visually induced motion sickness characteristic video is likely to cause motion sickness. The selection button 1102 of "No" is selected by the user as the viewer 2 in a case where the viewer determines that the visually induced motion sickness characteristic video is not likely to cause motion sickness. The information indicated by the button selected here is sent to the presentation unit 304.

The presentation unit 304 of the present embodiment obtains the information sent from the reception unit 1001 and controls display and hiding of the video content 4. For example, it is assumed that, in FIG. 6, after the viewer 2 watches the visually induced motion sickness characteristic video of the video content 4(C), it is inputted through the reception unit 1001 that the video content 4(C) is a video that is likely to cause motion sickness. Since the visually induced motion sickness characteristic video includes a partial video corresponding to a predetermined period including a visually induced motion sickness scene where the visually induced motion sickness intensity is "medium" in the video content 4(C), the display and hiding of the video content is controlled as follows. Specifically, the video contents 4(A), (B), and (C) of FIG. 6 are hidden, and only the video content 4(D) is displayed. Here, the visually induced motion sickness intensity may be compared based on the same visually induced motion sickness factor, or may be compared based on different visually induced motion sickness factors.

<Flow of Processing Executed by Image Processing Apparatus 101>

Figure 12:
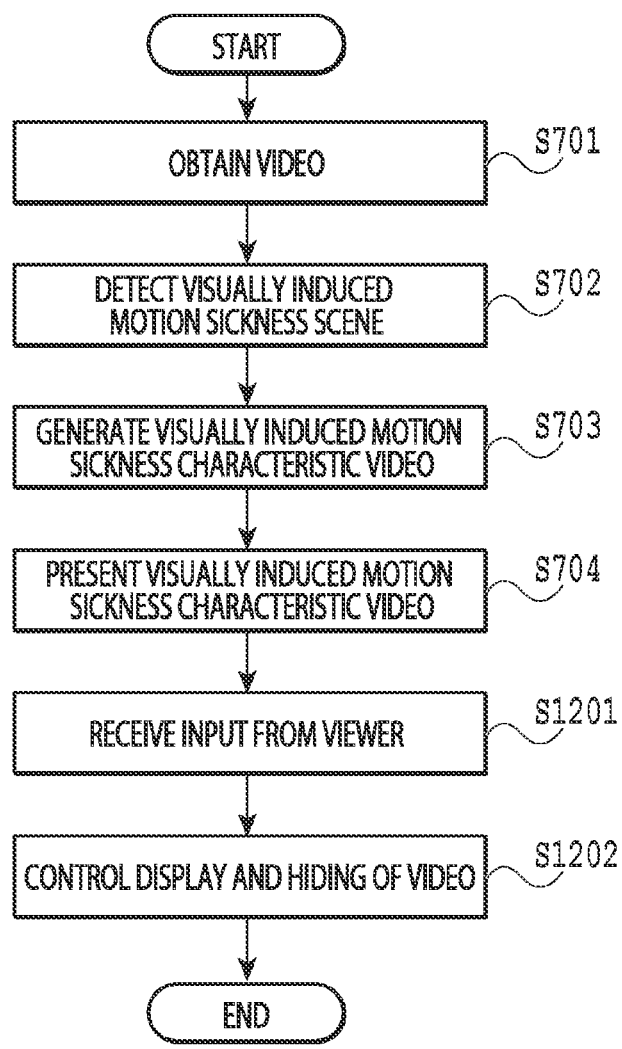
FIG. 12 is a flowchart showing a flow of processing executed by the image processing apparatus.

FIG. 12 is a flowchart showing a flow of processing executed by the image processing apparatus 101 according to the present embodiment. The processing from S701 to S704 is the same as in Embodiment 1, and description thereof will be omitted. After completing the process of S704, the processing moves to S1201.

In S1201, the reception unit 1001 receives input as to whether the visually induced motion sickness characteristic video presented in S704 is likely to cause the viewer 2 motion sickness.

In S1202, the presentation unit 304 controls display and hiding of the video content 4 based on the information received in S1201. In a case where receiving the information indicating that the video is likely to cause motion sickness in S1201 is received, the video content 4 whose visually induced motion sickness intensity is higher than the visually induced motion sickness characteristics presented in S704 is controlled to be hidden. In a case where the information indicating that the video is likely to cause motion sickness is not obtained in S1201, the display is not changed from S704, that is, the video will be displayed as is. For example, in a case where a visually induced motion sickness characteristic video obtained by connecting the visually induced motion sickness scenes A, C, D, and E is presented to the HMD 1 worn by the viewer, the UI screen 601 including the corresponding video content is presented to the HMD 1 worn by the viewer according to the viewer's input content received through the UI screen 1101.

Figure 13:
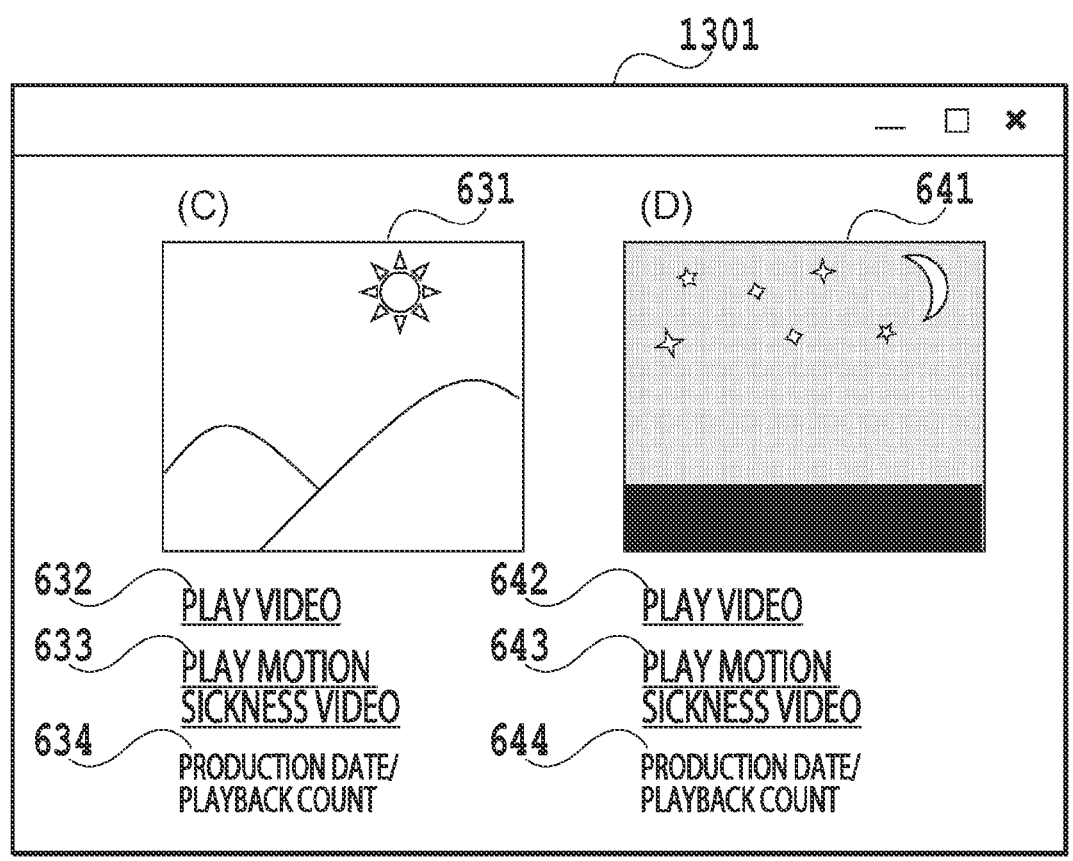
FIG. 13 is a diagram for explaining display and hiding of moving images.

Here, display and hiding control of a video upon receiving a "Yes" button operation on the UI screen 1101 will be described with reference to FIG. 13. FIG. 13 is a diagram for explaining the display and hiding control. FIG. 13 shows a control example of displaying and hiding a video in a case where the UI screen of FIG. 6 is displayed in S704 and input is received in S1201 that the video with the visually induced motion sickness scene intensity of a "high" is likely to cause motion sickness. The UI screen 1301 presented to the HMD 1 worn by the viewer hides the video contents A and B containing visually induced motion sickness scenes with a "high" intensity, and displays the video contents C and D not containing visually induced motion sickness scenes with a "high" intensity. On the other hand, in a case where a "No" button operation on the UI screen 1101 is received, the UI screen 601 presented to the HMD 1 worn by the viewer displays the video contents A, B, C, and D obtained by the video acquisition unit 301, as shown in the UI screen 601 of FIG. 6. After completing the process of S1202, the processing shown in FIG. 12 ends.

As described above, in the present embodiment, input is received as to whether the visually induced motion sickness characteristic video is likely to cause the viewer motion sickness. This makes it possible to receive input from the viewer and to control displaying and hiding the visually induced motion sickness characteristic video based on the received input. This allows the viewer to reduce the frequency of watching videos that are likely to cause visually induced motion sickness, and to more efficiently avoid visually induced motion sickness caused by watching visually induced motion sickness characteristic videos or video contents corresponding to the visually induced motion sickness characteristic videos.

Embodiment 4

In Embodiment 3, the description has been given of the embodiment where input from the viewer is received as to whether the visually induced motion sickness characteristic video is likely to cause motion sickness. In the present embodiment, an embodiment will be described in which time information on a visually induced motion sickness scene that causes visually induced motion sickness is obtained and the obtained time information is presented to the HMD 1 worn by the viewer. An image processing apparatus according to the present embodiment has the same hardware configuration as that in Embodiment 1, and description thereof will be omitted.

<Functional Configuration of Image Processing Apparatus>

Figure 14:
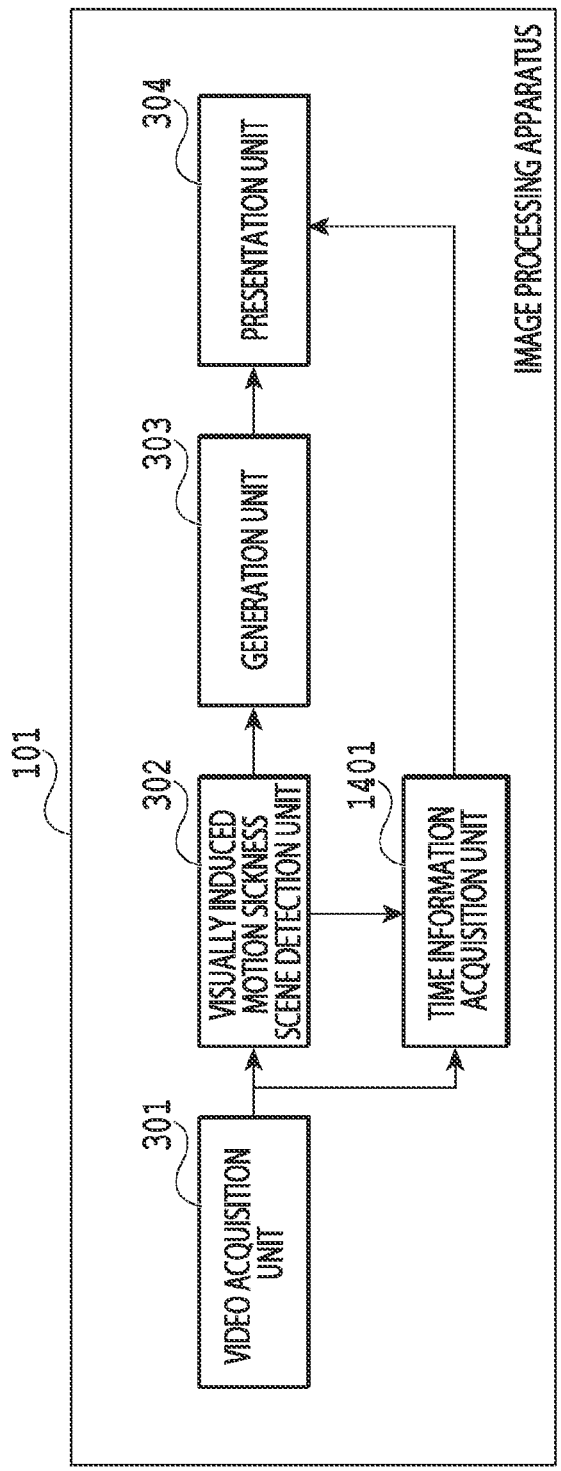
FIG. 14 is a block diagram showing a functional configuration of the image processing apparatus.

FIG. 14 is a block diagram showing a functional configuration example of an image processing apparatus included in an image processing apparatus system according to the present embodiment. The image processing apparatus according to the present embodiment includes a video acquisition unit 301, a visually induced motion sickness scene detection unit 302, and a generation unit 303, as in Embodiment 1. These functional units perform the same processing as in Embodiment 1, and thus description thereof will be omitted. An image processing apparatus 101 according to the present embodiment further includes a time information acquisition unit 1401 and a presentation unit 304. The presentation unit 304 of the present embodiment performs processing that is partially different from that of Embodiment 1.

The time information acquisition unit 1401 uses a video content 4 obtained from the video acquisition unit 301 and a visually induced motion sickness scene obtained from the visually induced motion sickness scene detection unit 302 to obtain time information indicating in which time frame the visually induced motion sickness scene occurs in the video content 4. The time information is, for example, information indicating the start time and end time of the visually induced motion sickness scene. The time information obtained here is stored in the HDD 204 or a cloud server (not shown) in association with the video content 4 and the visually induced motion sickness scene.

The presentation unit 304 of the present embodiment presents the time information obtained by the time information acquisition unit 1401 to the HMD 1 worn by the viewer 2, in addition to the contents presented in Embodiment 1, through a UI screen to display the time information.

<UI Screen>

FIGS. 15A and 15B are diagrams showing an example of a UI screen presented by the presentation unit 304 of the present embodiment. A UI screen 601, which is the main screen for presentation, displays a plurality of video contents 4, as in Embodiment 1. FIG. 15A shows four video contents 4, a video content 4(A), a video content 4(B), a video content 4(C), and a video content 4(D). In a time information display area, a solid square 1551 indicates time information of a visually induced motion sickness scene whose visually induced motion sickness factor corresponds to motion of the viewpoint position. A diagonally striped square 1552 indicates time information of a visually induced motion sickness scene whose visually induced motion sickness factor corresponds to motion of shooting object. A vertically striped square 1553 indicates time information of a visually induced motion sickness scene whose visually induced motion sickness factor corresponds to the sense of incompatibility between left and right. A dotted pattern square 1554 indicates time information of a visually induced motion sickness scene whose visually induced motion sickness factor corresponds to unnaturalness of 3D appearance. The tone of each square also indicates the level of intensity. Specifically, the square with a high density corresponds to a "high" visually induced motion sickness level. The square with a medium density corresponds to a "medium" visually induced motion sickness level. The square with a low density corresponds to a "low" visually induced motion sickness level. Note that the pattern and density of the squares may be changed depending on the factor and intensity of the visually induced motion sickness scene.

As in Embodiment 1, the UI screen 601 displays contents in accordance with the video content 4(A), including a thumbnail display screen 611, a video play button 612, a visually induced motion sickness characteristic video play button 613, and a summary information display area 614. As for the video content 4(A), a time information display area 1510 corresponding to the visually induced motion sickness characteristic video is further displayed in association with the video content 4(A). The time information display area 1510 shows time information 1511 and 1512 about a visually induced motion sickness scene A corresponding to a "high" intensity of the motion of the viewpoint position and a visually induced motion sickness scene D corresponding to a "low" intensity of the sense of incompatibility between left and right. The time information display area 1510 also shows time information 1513 and 1514 about a visually induced motion sickness scene C corresponding to a "high" intensity of the motion of the shooting object and a visually induced motion sickness scene E corresponding to a "low" intensity of the unnaturalness of 3D appearance.

The same applies to the video content 4(B), as in Embodiment 1. Specifically, as in the case of the video content 4(A), the UI screen 601 displays contents in accordance with the video content 4(B), including a thumbnail display screen 621, a video play button 622, a visually induced motion sickness characteristic video play button 623, and a summary information display area 624. As for the video content 4(B), a time information display area 1520 corresponding to the visually induced motion sickness characteristic video is further displayed in association with the video content 4(B). The time information display area 1520 shows time information 1521 and 1522 about a visually induced motion sickness scene F corresponding to a "high" intensity of the motion of the viewpoint position and a visually induced motion sickness scene H corresponding to a "high" intensity of the unnaturalness of 3D appearance.

The same applies to the video content 4(C), as in Embodiment 1. Specifically, as in the case of the video content 4(A), the UI screen 601 displays contents in accordance with the video content 4(C), including a thumbnail display screen 631, a video play button 632, a visually induced motion sickness characteristic video play button 633, and a summary information display area 634. As for the video content 4(C), a time information display area 1530 corresponding to the visually induced motion sickness characteristic video is further displayed in association with the video content 4(C). The time information display area 1530 shows time information 1531 and 1532 about a visually induced motion sickness scene I corresponding to a "medium" intensity of the motion of the viewpoint position and a visually induced motion sickness scene K corresponding to a "low" intensity of the sense of incompatibility between left and right. The time information display area 1530 also shows time information 1533 and 1534 about a visually induced motion sickness scene L corresponding to a "low" intensity of the unnaturalness of 3D appearance and a visually induced motion sickness scene J corresponding to a "low" intensity of the motion of the shooting object.

The same applies to the video content 4(D), as in Embodiment 1. Specifically, as in the case of the video content 4(A), the UI screen 601 displays contents in accordance with the video content 4(D), including a thumbnail display screen 641, a video play button 642, a visually induced motion sickness characteristic video play button 643, and a summary information display area 644. As for the video content 4(D), a time information display area 1540 corresponding to the visually induced motion sickness characteristic video is further displayed in association with the video content 4(D). The time information display area 1540 shows time information 1541 about a visually induced motion sickness scene M corresponding to a "low" intensity of the sense of incompatibility between left and right.

The time information display areas 1510, 1520, 1530, and 1540 each indicate in which time frame of the playback time of the video content 4 the corresponding visually induced motion sickness is likely to occur. The vertical lines shown in each of the time information display areas 1510, 1520, 1530, and 1540 indicate the start time and end time of the video content 4. The squares drawn on the line each indicate the time frame of each visually induced motion sickness scene, and correspond to the start time and end time of the visually induced motion sickness scene obtained by the time information acquisition unit 1401.

The method for displaying time information by the presentation unit 304 is not limited to the above. For example, the time information display areas 1510, 1520, 1530, and 1540 may each display a plurality of pieces of information for each motion sickness factor, or may each display only the longest time information obtained from the time information acquisition unit 1401.

<Flow of Processing Executed by Image Processing Apparatus 101>

Figure 16:
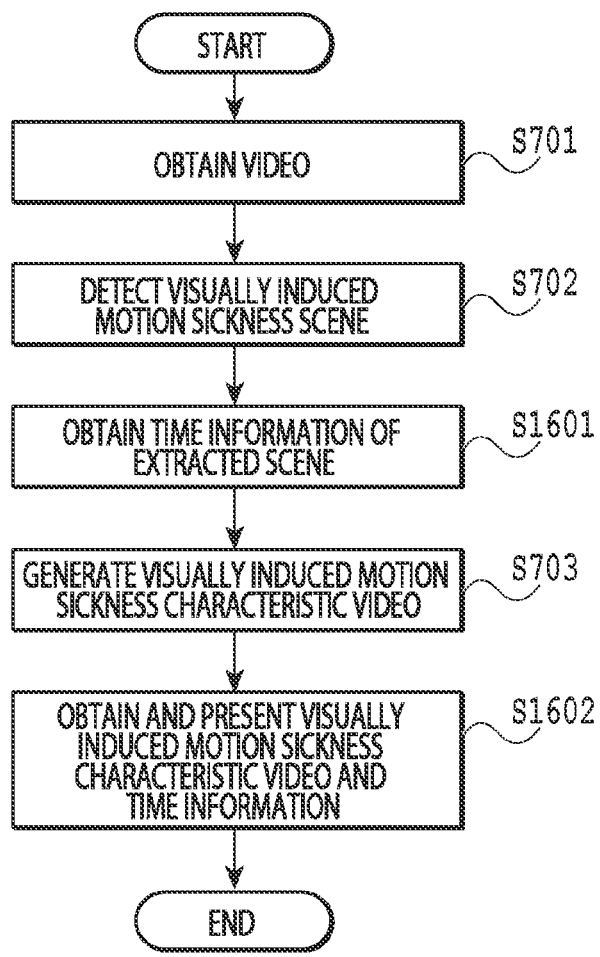
FIG. 16 is a flowchart showing a flow of processing executed by the image processing apparatus.

FIG. 16 is a flowchart showing a flow of processing executed by the image processing apparatus 101 according to the present embodiment. The processing of S701 and S702 is the same as in Embodiment 1, and description thereof will be omitted. After completing the process of S702, the processing moves to S1601.

In S1601, the time information acquisition unit 1401 obtains time information on the visually induced motion sickness scene detected in S702. After completing the process of S1601, the processing moves to S703. The process of S703 is the same as in Embodiment 1, and description thereof will be omitted. After completing the process of S703, the processing moves to S1602.

Figure 15:
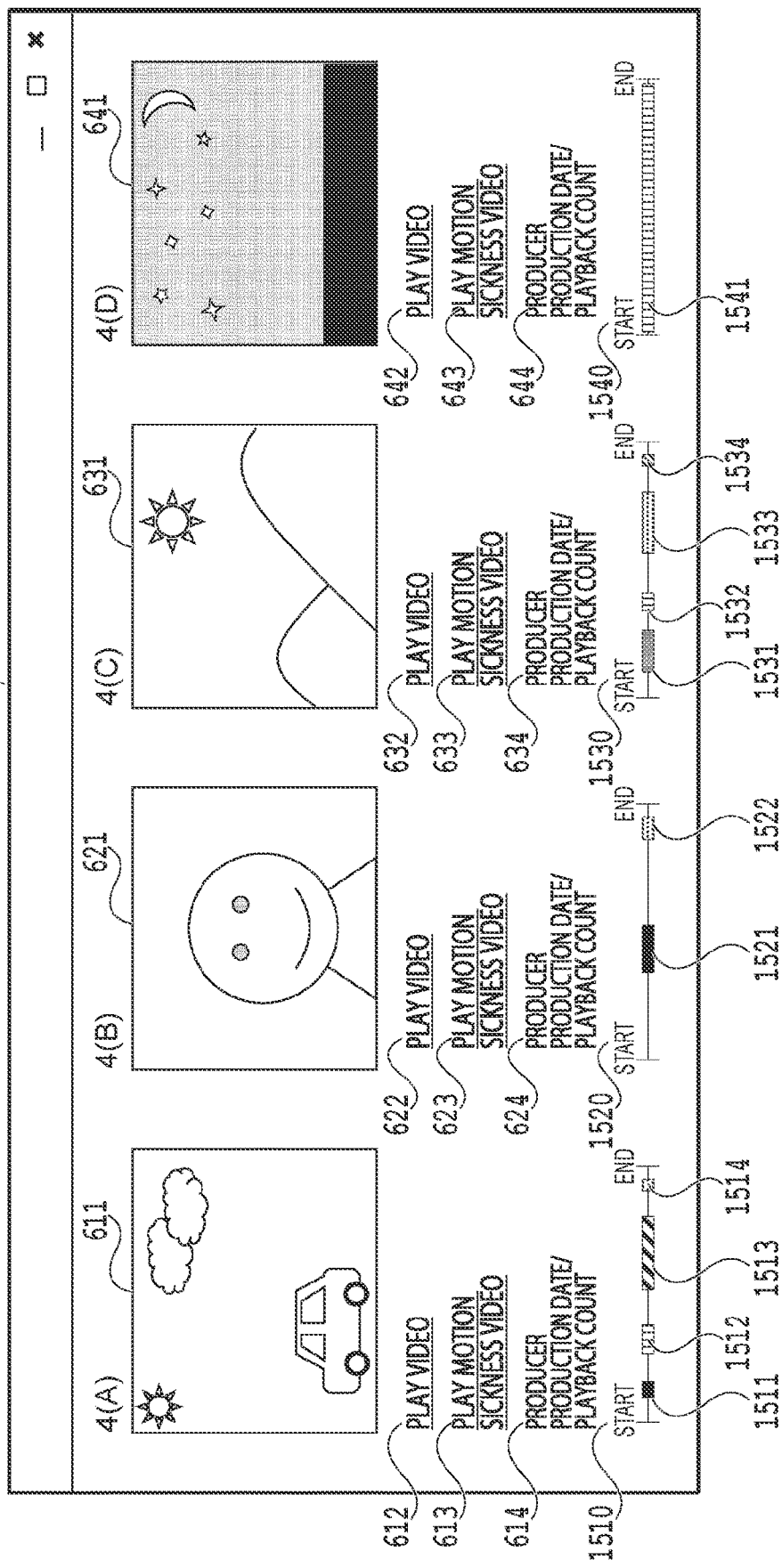
FIGS. 15A and 15B are diagrams showing a UI screen example of presenting a video content.

In S1602, the presentation unit 304 uses the UI screen 601 shown in FIG. 15, for example, to present the visually induced motion sickness characteristic video generated in S703 and the visually induced motion sickness time information obtained in S1601 to the HMD 1 worn by the viewer 2 in association with the corresponding video content. After completing the process of S1602, the processing shown in FIG. 16 ends.

As described above, according to the present embodiment, time information of a visually induced motion sickness scene that causes visually induced motion sickness is obtained and presented to the HMD 1 worn by the viewer. By showing the time information related to the visually induced motion sickness as described above, the viewer can use such information to decide whether to watch the video content and whether to take a break while watching, or the like, and can effectively prevent visually induced motion sickness.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

According to the embodiments described above, the viewer can determine whether a video to be watched is likely to cause motion sickness before watching the video, thus effectively preventing visually induced motion sickness.

This application claims priority to Japanese Patent Application No. 2023-061732, which was filed on Apr. 5, 2023 and which is hereby incorporated by reference herein in its entirety.

What is claimed is:

1. An image processing apparatus comprising:
one or more memories;
a storage device; and
one or more processors, wherein the one or more memories and the one or more processors are configured to:
detect a specific scene that causes visually induced motion sickness from a video for a predetermined display device;
generate a partial video corresponding to a predetermined period including the detected specific scene in the video; and
present the partial video to the predetermined display device,
wherein the storage device stores a plurality of alternative videos that exhibit an identical degree of visually induced motion sickness as the partial video and that serve as substitutes for the partial video, and
wherein the one or more memories and the one or more processors are further configured to select an alternative video corresponding to the partial video from among the plurality of alternative videos and present the alternative video corresponding to the partial video.

2. The image processing apparatus according to claim 1, wherein
in a case where the one or more memories and the one or more processors detect a plurality of specific scenes that cause visually induced motion sickness, the one or more memories and the one or more processors are further configured to generate an image by connecting a plurality of partial videos corresponding to each predetermined period including the plurality of specific scenes in the video.

3. The image processing apparatus according to claim 1, wherein
in a case where the one or more memories and the one or more processors detect a respective specific scene for each of a plurality of visually induced motion sickness factors, the one or more memories and the one or more processors are further configured to generate a video by connecting a plurality of partial videos corresponding to each predetermined period including at least one of the respective specific scenes detected for the plurality of visually induced motion sickness factors in the video.

4. The image processing apparatus according to claim 1, wherein
in a case where the one or more memories and the one or more processors detect a respective plurality of specific scenes according to a level of visually induced motion sickness intensity for each of a plurality of visually induced motion sickness factors, the one or more memories and the one or more processors are further configured to generate a video by connecting a plurality of partial videos corresponding to a predetermined period including a specific scene, of the respective plurality of specific scenes, with a highest visually induced motion sickness intensity for each of the plurality of visually induced motion sickness factors in the video.

5. The image processing apparatus according to claim 4, wherein
the plurality of visually induced motion sickness factors are any of motion of a viewpoint position, motion of a shooting object, a sense of incompatibility between left and right, and unnaturalness of 3D appearance.

6. The image processing apparatus according to claim 1, wherein
the one or more memories and the one or more processors are further configured to generate the partial video such that the partial video is blurred.

7. The image processing apparatus according to claim 1, wherein
the one or more memories and the one or more processors are further configured to generate the partial video such that its hue is changed.

8. The image processing apparatus according to claim 1, wherein
the one or more memories and the one or more processors are further configured to detect the specific scene based on information indicating motion of a viewpoint position of the video.

9. The image processing apparatus according to claim 1, wherein
the one or more memories and the one or more processors are further configured to detect the specific scene based on information indicating motion of a shooting object of the video.

10. The image processing apparatus according to claim 1, wherein
the one or more memories and the one or more processors are further configured to detect the specific scene based on information indicating a difference between left and right images of the video.

11. The image processing apparatus according to claim 1, wherein
the one or more memories and the one or more processors are further configured to detect the specific scene based on information indicating parallax between left and right images of the video.

12. The image processing apparatus according to claim 1, wherein
the one or more memories and the one or more processors are further configured to detect the specific scene according to a level of visually induced motion sickness intensity.

13. The image processing apparatus according to claim 1, wherein
the one or more memories and the one or more processors are further configured to perform control to display a thumbnail image of the video corresponding to the partial video on a UI screen.

14. The image processing apparatus according to claim 13, wherein the UI screen displays a first GUI for playing the partial video, and the partial video corresponding to the first GUI is played in a case where a user operation on the first GUI is received.

15. The image processing apparatus according to claim 13, wherein the UI screen displays a second GUI for playing the video, and the partial video corresponding to the video is played before the video corresponding to the second GUI is played in a case where a user operation on the second GUI is received.

16. The image processing apparatus according to claim 1, wherein the one or more memories and the one or more processors are further configured to:

receive input as to whether the partial video is likely to cause visually induced motion sickness; and control display of the video according to information obtained from the received input.

17. The image processing apparatus according to claim 16, wherein in a case where the one or more memories and the one or more processors receive the input indicating that the partial video is likely to cause visually induced motion sickness, the one or more memories and the one or more processors are further configured to perform control so as not to display the video including the specific scene with a visually induced motion sickness intensity higher than or equal to a visually induced motion sickness intensity indicated by information obtained from the received input.

18. The image processing apparatus according to claim 1, wherein the one or more memories and the one or more processors are further configured to:

obtain time information from the video and the partial video; and present time information of the video and time information of the partial video based on the obtained time information.

19. The image processing apparatus according to claim 18, wherein the one or more memories and the one or more processors are further configured to present the time information in a display format according to a visually induced motion sickness factor and intensity of the partial video.

20. The image processing apparatus according to claim 1, wherein the one or more memories and the one or more processors are further configured to display the partial video corresponding to the video on the predetermined display device or on an information terminal used by the viewer.

21. The image processing apparatus according to claim 1, wherein the video for the predetermined display device includes a video for a head-mounted display or a video for a 3D display device.

22. An image processing method comprising:

detecting a specific scene that causes visually induced motion sickness from a video for a predetermined display device;

generating a partial video corresponding to a predetermined period including the detected specific scene in the video;

presenting the partial video to the predetermined display device;

selecting an alternative video corresponding to the partial video from among a plurality of alternative videos that exhibit an identical degree of visually induced motion sickness as the partial video and that serve as substitutes for the partial video; and presenting the alternative video.

23. A non-transitory computer readable storage medium storing computer-executable instructions for causing a computer to perform an image processing method comprising:

detecting a specific scene that causes visually induced motion sickness from a video for a predetermined display device;

generating a partial video corresponding to a predetermined period including the detected specific scene in the video;

presenting the partial video to the predetermined display device;

selecting an alternative video corresponding to the partial video from among a plurality of alternative videos that exhibit an identical degree of visually induced motion sickness as the partial video and that serve as substitutes for the partial video; and presenting the alternative video.

* * * * *